United States Patent Office 3,336,939
Patented Aug. 22, 1967

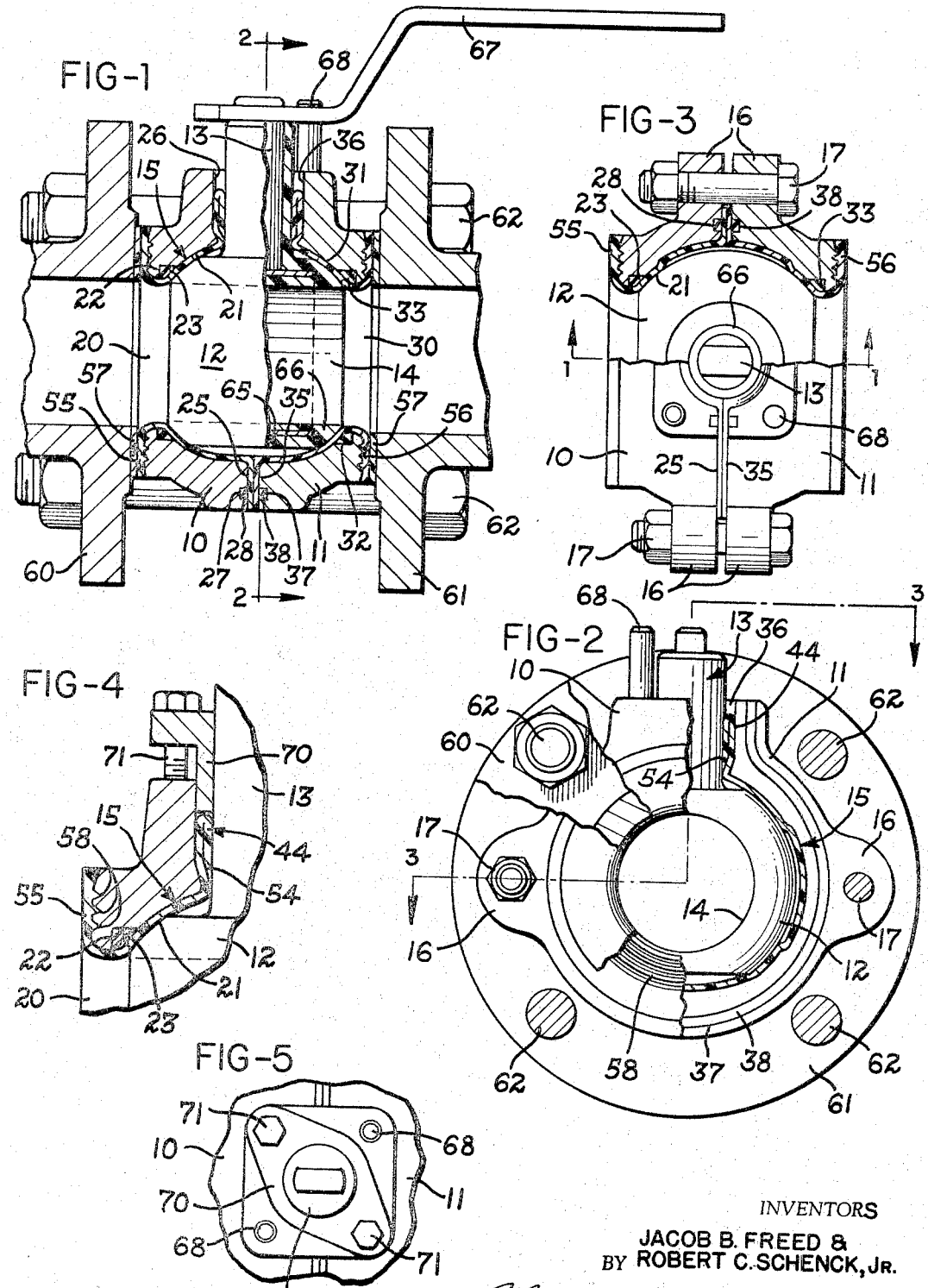

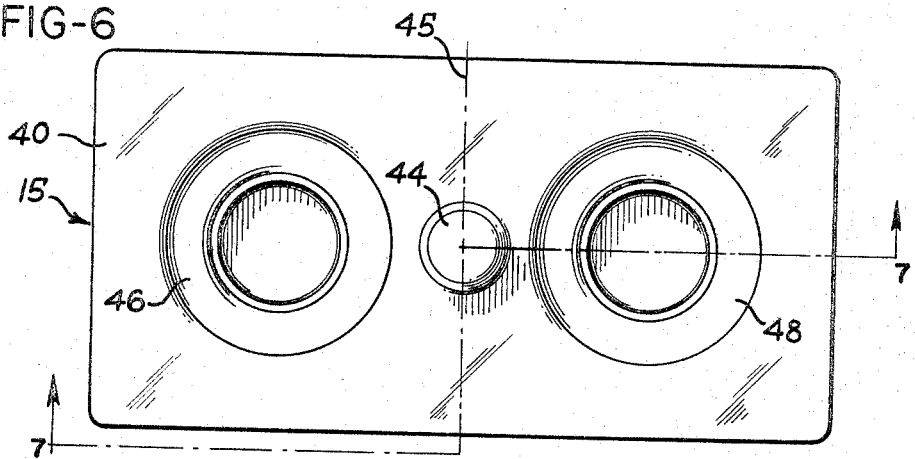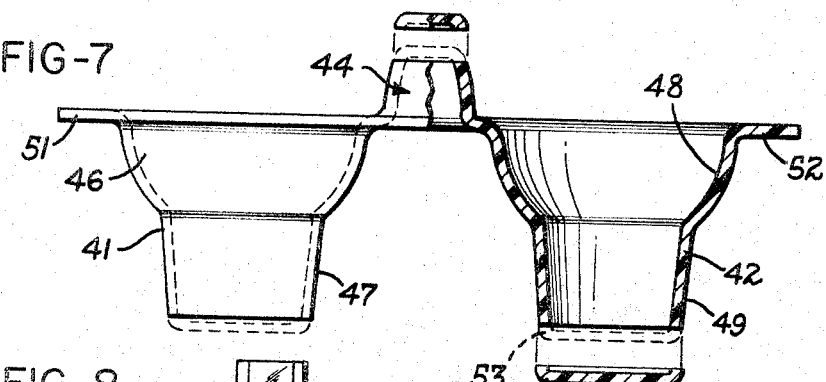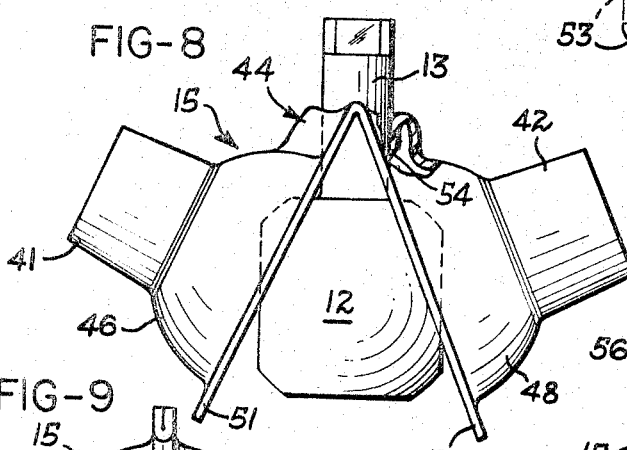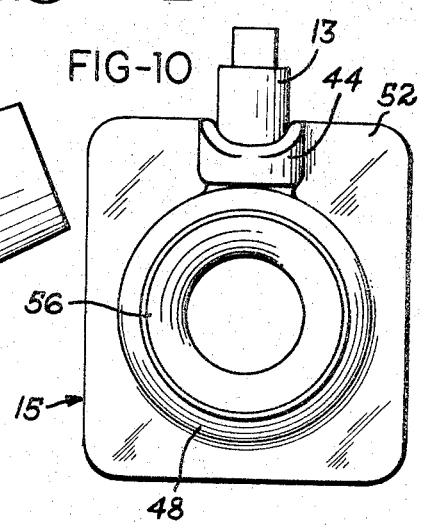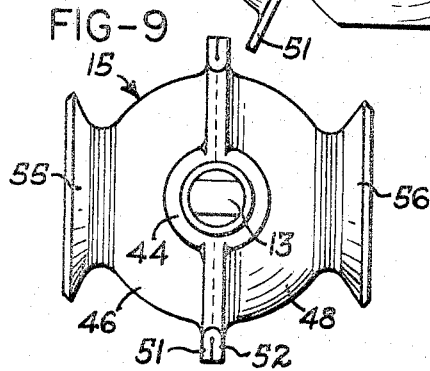

3,336,939
VALVES
Jacob B. Freed, Battle Creek, Mich., and Robert C. Schenck, Jr., Dayton, Ohio, assignors to The Duriron Company, Inc., Dayton, Ohio, a corporation of New York
Filed Mar. 19, 1964, Ser. No. 353,108
16 Claims. (Cl. 137—375)

This application relates to ball valves, and more particularly to a corrosion resistant ball valve having special structural and operational features.

It is a primary object of the invention to provide a ball valve of novel and economical construction wherein all metal parts which might come in contact with fluid traversing the valve are covered and protected by a corrosion resistant liner member of novel characteristics which eliminate fluid-trapping pockets and also contribute to low operating torque.

Another object of the invention is to provide a ball valve as outlined above which is of such construction that a single liner member covers all areas in the valve body which might otherwise come in contact with fluid traversing the valve, and it is especially an object of the invention to provide such a lined ball valve which is constructed for simple and rapid removal and replacement of the liner member.

An additional object of the invention is to provide a corrosion resistant ball valve as outlined above wherein the liner member is fabricated of sheet plastic material having corrosion resistant properties and does not require involved molding or coining operations.

A further object of the invention is to provide a corrosion resistant ball valve as outlined above wherein the valve body is formed of two complementary, and preferably identical, body members having mating gasket faces which meet along the center line of the valve and include complementary portions defining the passageway for the operating stem of the valve ball.

A still further object of the invention is to provide a corrosion resistant ball valve as outlined in the preceding paragraph wherin a single liner member lines and protects the valve chamber, the valve ports and also the passageways for the valve operating stem.

It is also an object of the invention to provide a novel method of fabricating a liner member for a ball valve wherein the starting material is a plain sheet of corrosion resistant plastic material, and the only fabricating steps are simple forming and trimming operations on such sheet.

Other objects and advantages will be apparent from the following description, the accompanying drawings and the appended claims.

In the drawings—

FIG. 1 is an axial section taken on the line 1—1 of FIG. 3 showing a valve construction in accordance with the invention and connected in operating relation between a pair of pipes;

FIG. 2 is a view taken partially on the line 2—2 of FIG. 1 and broken away at a plurality of levels;

FIG. 3 is a view partly in plan and partly in section as indicated by the line 3—3 of FIG. 2;

FIG. 4 is an enlarged fragmentary view similar to FIG. 1 and showing a modified construction;

FIG. 5 is a plan view of the modified structure of FIG. 4;

FIG. 6 is a plan view of a liner member blank in accordance with the invention and shown at an intermediate stage of its fabrication;

FIG. 7 is a view at right angles to FIG. 6 and partly in section as indicated by the line 7—7 of FIG. 6;

FIG. 8 is a side elevational view, partly broken away, showing a step in the assembly of the liner formed from the blank of FIGS. 6 and 7 with a valve ball;

FIG. 9 is a top view of the liner and ball sub-assembly; and

FIG. 10 is an end elevational view of the liner and ball sub-assembly.

Referring to the drawings, which illustrate preferred embodiments of the invention, the main components of the valve comprise body members 10 and 11, a valve ball 12 having an operating stem 13 and through port 14, and a liner member indicated generally at 15. The body members 10 and 11 are of identical construction and include laterally extending apertured ear portions 16 through which they are secured together by nuts and bolts 17.

The body member 10 has a port 20 at the outside thereof, and its inner surface 21 is spherically curved substantially complementarily to the ball 12. Its inner surface intermediate the port 20 and portion 21 is formed with a circumferential shoulder 22 which receives a ring 23 of resilient material as best seen in FIG. 4. The inner side 25 of the body member 10 is essentially flat except for a semi-cylindrical portion 26 extending from the top of the valve body to the spherically curved portion 21, and the surface 25 may also be provided with a groove 27 for receiving a gasket 28 of resilient material.

The body member 11 similarly includes a port 30 and spherically curved surface 31 corresponding to the areas 20 and 21 of the body 10, and it has a similar circumferential shoulder 32 receiving a resilient ring 33. The inner side 35 of the body member 11 is shaped for mating engagement with the side 25 of body member 10, and it includes a similar cylindrically curved groove 36 which cooperates with the groove 26 to define a passageway for the valve stem 13. The side 35 also has a groove 37 for a sealing gasket 38 as shown.

The liner member 15 and the method by which it is fabricated in accordance with the invention are shown in detail in FIGS. 8–10. The starting material is a blank 40 of corrosion resistant sheet plastic material such preferably as a fluorocarbon resin of the type sold under the trade name Teflon. The sheet blank 40 is initially cut to rectangular shape having a length approximately twice its width, and these dimensions are established so that each half of the blank 40 is approximately a square having its sides equal to the cross sectional dimensions of the valve body member surfaces 25 and 35.

The sheet blank 40 is first subjected to forming steps by which the central portion of each half thereof is formed into a tubular portion indicated generally at 41 and 42 in FIG. 7, and a third tubular portion 44 similar to the portions 41–42 is formed in the opposite direction from the portions 42—42 at the center of the center line 45 across the width of the blank 40. The tubular portions 41–42 are adapted to cooperate with either of the body members 10 and 11, and for convenience of description, the portion 41 is described as intended for mounting within body member 10.

In the first forming step the tubular portion 41 is provided with a generally spherically curved inner end portion 46 corresponding generally to the spherically curved surface 21, and the outer end portion 47 of tubular portion 41 is cylindrical or slightly tapered to fit within port 20. The tubular portion 42 is of identical shape and comprises a spherically curved portion 48 and outer end portion 49, and the remaining flat portions of the blank 40 form flanges 51 and 52 surrounding the tubular portions 41 and 42 respectively. Since the third tapered portion 44 is intended to be received in the passageway 26, 36 in the finished valve, it is correspondingly of smaller proportions, and it may be beveled around its outer end to provide a lip 54 of tapered section.

The tubular portions 41, 42 and 44 are initially formed with closed outer ends as shown, and in the next fabricating step, these ends are removed as indicated at 53 in FIG. 7. After these operations, the blank is ready for assembly with a valve ball, as illustrated in FIGS. 8–10.

The first assembly step is to insert the valve stem through the tubular portion 44, from the top as the liner is viewed in FIG. 7. The blank is then folded on its center line 45 around the ball to bring the inner ends of the tubular portions 41 and 42 into face-to-face aligned relation as shown in FIGS. 8 and 9. This folding step brings the surrounding flange portions 51–52 into face to face relation, and it also turns the tubular portion 44 partially inside out so that it is doubled in thickness as best seen in FIGS. 1 and 8. The resulting liner and ball subassembly is then ready for mounting between body members 10–11, which are secured together by the nuts and bolts 17. Assembly of the valve also includes insertion of the rings 23 and 33 and the gaskets 28 and 38 in their respective grooves as previously noted.

At a convenient time in the fabrication and assembly of the liner member, the cylindrical portions 47 and 49 are formed into outwardly flaring flanges 55 and 56 respectively which overlie the end faces of the body members in the completed valve. Formation of these flanges may be done before final assembly of the valve, but assembly may be easier if this operation is postponed until after final assembly. In either case it is readily accomplished by a spinning operation or with a suitable flaring punch.

FIGS. 1 and 2 show the completed valve connected in a pipe line by clamping it between flanged pipe ends 60–61 by means of through bolts 62, which also serve to center the valve bodies 10–11 with respect to the pipes. In this assembled position, the flange portions 55 and 56 which overlie the end faces of the body members abut the adjacent ends of the respective pipes, preferably through a suitable gasket 57. It has also been found desirable to provide the end face of each body member with a plurality of concentric grooves 58, as best shown in FIG. 4, into which the material of the adjacent flange 55 or 56 will extrude under clamping pressure to lock the flange firmly into desired position.

The valve construction of the invention accordingly provides a complete lining of the interior of a two-piece valve body by a single liner member which is made from sheet plastic material by a simple fabricating method requiring no involved forming operations or coining. The valve can be made fully corrosion resistant by constructing the ball 12 from a corrosion resistant material, but in larger valves it is more practical to construct the valve of an annular metal core 65 to which the stem 13 is welded or otherwise secured, and then to embed this core entirely in a covering of fluorocarbon material as indicated at 66 in FIG. 1. FIG. 1 also shows the operating handle 67 for the ball, which is limited in its movements between the open and closed positions of the valve by a pair of stop pins 68 mounted on body members 10 and 11 as shown in FIGS. 1 and 5.

For many uses, the valve constructed as already described provides entirely adequate sealing around the ball stem 13, particularly with the aid of the double thickness of the tubular portion 44 and the beveled lip 54 providing a lip seal action around the stem. The invention also makes provision for increased sealing around the stem 13 by the modified construction shown in FIGS. 4 and 5, wherein a suitable gland follower 70 is mounted on top of the body members by adjusting screws 71 as shown and includes a gland portion which extends into the upper end of the annular passageway between the stem 13 and the body surfaces 26 and 36 and is adjustable by the screws 71 into compressing relation with the tubular liner portion 44.

While the method and forms of apparatus herein described constitute preferred embodiments of the invention, it is to be understood that the invention is not limited to the precise method and forms of apparatus, and that changes may be made therein without departing from the scope of the invention which is defined in the appended claims.

What is claimed is:

1. A corrosion resistant ball valve comprising a pair of complementary body members each defining substantially one-half of a generally spherical body cavity and each having a port at the outer end thereof and having the other end thereof in opposing relation with the opposing end of the other said body member, said body members having said opposing ends thereof defining complementary portions of a passageway for receiving a valve operating stem therethrough, a unitary liner member of corrosion resistant sheet material of substantially uniform thickness enclosed by said body members and including a pair of integral tubular portions each comprising a spherically curved part forming a lining for substantially one-half of said body cavity through and forming a lining for the adjacent said port, said liner member including a third integral tubular portion projecting radially from said spherically curved parts into and forming a lining in said passageway, said liner member also including integral flange portions extending generally radially outwardly from the peripheries of said spherically curved parts respectively and projecting from said body cavity between said inner sides of said body members, a ball member received in said liner member in sealing relation with said liner member and including an operating stem extending through said third tubular portion of said liner member to the outside of said valve, and means clamping said body members together in sealing relation with said flange portions of said liner member and with said stem and said third tubular portion of said liner member.

2. A ball valve as defined in claim 1 wherein said third tubular portion of said liner member is partially turned outside-in and the end thereof forms a lip seal engaging said stem.

3. A ball valve as defined in claim 2 comprising gland means mounted on said body members for movement lengthwise of said passageway to compress said third tubular portion axially of said stem into increased sealing pressure engagement with said stem and the surrounding surface portions of said inner sides of said body members.

4. A ball valve as defined in claim 1 comprising means defining a circumferential shoulder adjacent the inner end of said port in each of said body members, and a ring of resilient material received between said liner member and each of said shoulders for effecting resilient sealing pressure engagement between said liner member and said ball.

5. A ball valve as defined in claim 4 comprising a resilient member retained between each of said flange portions of said liner member and said opposing end of the adjacent said body member for increasing the sealing pressure engagement of said body members with said flange portions.

6. A ball valve as defined in claim 1 comprising an integral annular flange forming the outer end of each of said pair of tubular portions and extending radially outwardly therefrom in overlapping relation with the end face portion of the adjacent said body member surrounding the outer end of said port therein.

7. A ball valve as defined in claim 6 wherein said end face portion of each of said body members has at least one circumferential groove therein concentric with said port therein and underlying the associated said annular flange.

8. A blank for fabrication of a liner member for use in a ball valve, comprising a sheet of corrosion resistant fluorocarbon material having a length substantially greater than that of its width, each half of said sheet having the central portion thereof formed out of the plane of said sheet into a pair of tubular portions, the central portion of said sheet being formed into a third tubular shape smaller than and equidistant from said pair of tubular portions.

9. A blank as defined in claim 8 which is folded along the center line across the width thereof to position said flange portions and the inner ends of said pair of tubular portions in face-to-face aligned relation defining an open chamber and with said third tubular portion located on the resulting said fold line and defining a passageway extending radially outwardly from said chamber between said flange portions.

10. A liner member for a ball valve comprising a blank as defined in claim 9 wherein the axially outer end portion of said third tubular portion is turned inwardly of the remainder thereof to form a lip seal for engagement with the stem of the associated valve ball.

11. A liner member for a ball valve as defined in claim 10 wherein the outer end portion of said third tubular portion is beveled to provide a relatively sharp edge along said lip seal.

12. The method of fabricating a liner member for a corrosion resistant ball valve from a sheet of corrosion resistant plastic material which comprises the steps of cutting said sheet to a length substantially greater than the width thereof, forming the central portion of each half of said sheet in the same direction out of the plane of said sheet to provide a pair of parallel tubular portions each surrounded by a flange portion of said sheet, forming the central portion of said sheet into a third tubular portion substantially smaller than said pair of tubular portions, removing the ends of all three of said tubular portions, and folding said sheet along the center line across the width thereof to bring said flange portions and the inner ends of said pair of tubular portions into face-to-face aligned relation defining an open chamber with said third tubular portion forming a passageway extending radially outwardly from said chamber between said flange portions.

13. The method of fabricating a liner member as defined in claim 12 wherein the first named forming step includes the operation of forming the inner end portions of said pair of tubular portions to a spherically curved configuration.

14. The method of fabricating a liner member which includes the steps defined in claim 13 and the step of forming the outer end portion of each said pair of tubular portions into a generally radially outwardly extending annular flange.

15. The method of fabricating a liner member as defined in claim 13 which includes the steps of inserting the stem of a valve ball into said third tubular portion prior to said folding step, and causing said spherically curved portions to envelop said valve ball during said folding step.

16. The method of fabricating a liner member as defined in claim 13 wherein said third tubular portion is initially formed in the opposite direction from said pair of tubular portions and including the steps of inserting said stem in said third tubular portion inside-out from the end thereof remote from said flange portions, and turning said third tubular portion partially inside-out around said stem during said folding step.

References Cited
UNITED STATES PATENTS

| | | | |
|---|---|---|---|
| 3,073,336 | 1/1963 | Johnson | 137—375 |
| 3,108,779 | 10/1963 | Anderson | 251—317 X |
| 3,124,334 | 3/1964 | Szohatsky | 251—315 X |
| 3,244,398 | 4/1966 | Scaramucci | 251—317 X |

FOREIGN PATENTS

| | | |
|---|---|---|
| 149,684 | 7/1950 | Australia. |
| 647,005 | 8/1962 | Canada. |

M. CARY NELSON, *Primary Examiner.*

HENRY T. KLINKSIEK, *Examiner.*